United States Patent [19]
Watts

[11] 3,954,192
[45] May 4, 1976

[54] MEANS FOR LOADING CARS IN A RAILROAD TRANSPORTATION SYSTEM

[75] Inventor: Max Welton Watts, Tiger, Ga.

[73] Assignee: Aid Corporation, Clayton, Ga.

[22] Filed: Mar. 25, 1974

[21] Appl. No.: 454,445

[52] U.S. Cl................................ 214/38 BB; 198/96; 198/101; 198/127 R; 214/84
[51] Int. Cl.² ........................................... B65G 67/02
[58] Field of Search.......... 214/38 B, 38 BA, 38 BB, 214/38 D, 84, 152; 198/96, 101, 127, 203

[56] References Cited
UNITED STATES PATENTS

| | | | |
|---|---|---|---|
| 2,705,570 | 4/1955 | Maissian | 198/96 X |
| 2,746,616 | 5/1956 | Sinclair | 198/96 X |
| 3,075,659 | 1/1963 | Sylvester et al. | 214/38 B |
| 3,374,878 | 3/1968 | Kornylak | 214/38 D X |
| 3,489,300 | 1/1970 | McCartney et al. | 214/38 BA |

Primary Examiner—Robert G. Sheridan
Attorney, Agent, or Firm—Newton, Hopkins & Ormsby

[57] ABSTRACT

A cargo loading system is disclosed comprising a car, cargo conveying means mounted on the car, and transmission means also mounted on the car for transmitting driving force to the cargo conveying means. Drive means are positioned at a cargo loading station. Coupling means are also provided for coupling the drive means with the transmission means when the car is located at the loading station.

A method is also disclosed for loading cars with cargo. The method comprises the steps of positioning a car having first cargo conveyor means mounted thereto adjacent a cargo transfer platform having second cargo conveying means mounted thereto. The first and second cargo conveying means are mechanically coupled together. One of the cargo conveyor means is then coupled with conveyor drive means which drive the first and second conveyor means simultaneously.

7 Claims, 10 Drawing Figures

MEANS FOR LOADING CARS IN A RAILROAD TRANSPORTATION SYSTEM

BACKGROUND OF THE INVENTION

This invention relates generally to cargo loading systems, and particularly to means and methods for loading cars in railroad transportation systems at preselected loading stations.

Recently, railroad transportation systems have been devised for transporting small cars or dollies in freight handling and distribution areas such as, for example, between loading docks and distribution areas in manufacturing and processing plants. These railroad systems typically include a circuitous system of tracks which extend from aside one or more cargo loading docks past a series of stations at which the cargo may be unloaded. A conveyor belt typically extends from the loading dock to the periphery of the area exteriorly of the building in which the circuitous track is located at which periphery a warehouse or conventional loading dock is located for receiving cargo from trucks or interstate railroad cars.

The cars or dollies used in such railroad transportation systems are frequently controlled by programmed computers. Such automated systems minimize the need for manual car drive control as well as for manual handling of cargo at the loading dock and distribution stations. Equipment has thus heretofore been devised for automatically halting cars on the tracks aside the docks and distribution stations, for urging cargo on or off the cars, and then for driving the cars from the loading dock or stations leaving the stations ready to receive other cars.

Notwithstanding the highly desirable automation features provided by the just-described systems, in actual practice the systems have failed to perform their loading and unloading function effectively. In practice cargo is typically handled as individual modules supported upon individual pallets which must be urged completely onto and off the cars at the loading stations. Where such action is not fully accomplished a portion of the cargo carrying pallet is left overhanging the loading side of the car where it becomes susceptible of being snagged by structural components of the station itself as the car departs the station or approaches the next successive station. This action may well cause the cargo to fall from the car or loading dock and be damaged. Even where such overhanging cargo successfully leaves and approaches the loading stations, it may, nevertheless, encounter structural objects adjacent the tracks between stations and be knocked to the floor. In some cases the cargo may even fall from the car without encountering a stationary object such as when rounding a curve in the tracks.

Efforts have been made to alleviate the just-described problems by employing conveying means on the car itself. Such means are typically driven when the car is positioned at a loading station by a pair of friction wheels which abut one another at the loading station to transmit a driving force between the wheel located at the dock and the wheel located on the car. With this system, however, the friction wheel located at the loading station must impart substantial lateral force against the friction wheel on the car in order to prevent slippage between the two wheels. This lateral force is so strong as often to cause the car to tilt away from the loading dock which serves to endanger the security of cargo on the car, to create danger of car derailment, and to uncouple the conveyor means on the car from that on the dock.

Accordingly it is a general object of the present invention to provide improved means and methods for loading and unloading cars in railroad transportation systems.

More specifically, it is an object of the invention to provide a cargo loading system by which cargo may be conveyed at a loading station onto and off a car without leaving a portion of the cargo overhanging the car as a result of incomplete cargo transfer.

Another object of the invention is to provide means for loading a car having cargo conveyor means mounted thereon from a loading dock also having cargo conveying means located thereon which loading dock conveyor means drives the conveying means disposed on the car with positive driving action.

SUMMARY OF THE INVENTION

In one form of the invention a cargo loading system is provided comprising a car, cargo conveying means mounted on the car, and transmission means mounted on the car for transmitting driving force to the cargo conveying means. The system further includes drive means positioned at a cargo loading station and gear coupling means for coupling the drive means with the transmission means when the car is located at the loading station.

In another form of the invention a cargo loading system is provided comprising a cargo transfer platform for receiving cargo, first conveyor means supported on the cargo transfer platform for moving cargo thereover, and drive means for driving the first conveyor means. The system further includes a car, second conveyor means supported on the car for moving cargo thereonto received from or delivered to the cargo transfer platform, and coupling means for coupling the first and second conveyor means together when the car is located adjacent the cargo transfer platform for loading or unloading.

In yet another form of the invention a method is provided for loading cars with cargo. The method comprises the steps of positioning a car having first cargo conveyor means mounted thereto adjacent a cargo transfer platform having second cargo conveyor means mounted thereto. The first and second cargo conveyor means are mechanically coupled together. One of the cargo conveyor means is then coupled with the drive means which drive the first and second conveyor means simultaneously.

DETAILED DESCRIPTION OF THE DRAWING

Figure 1:
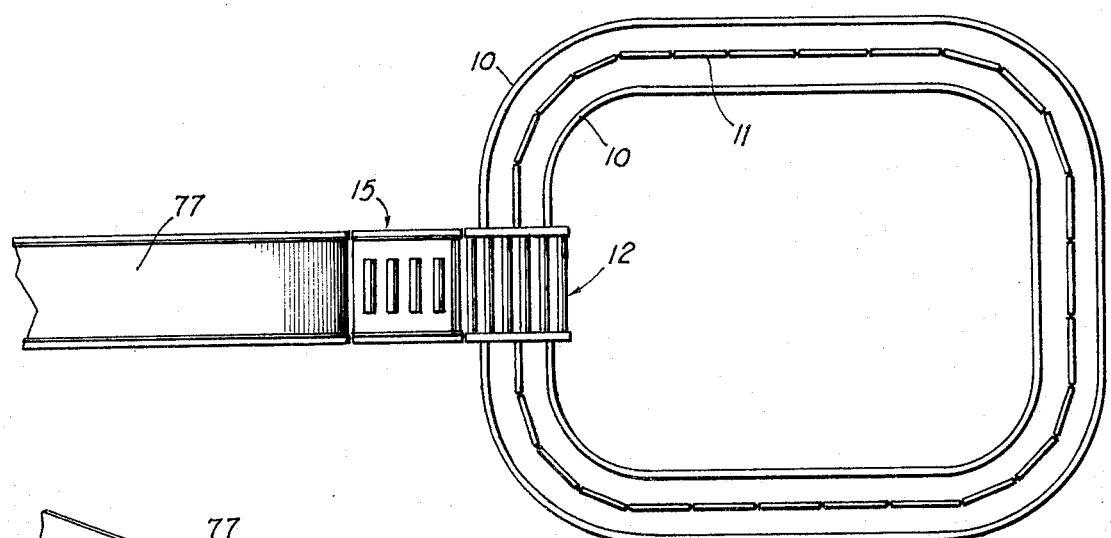
FIG. 1 is a schematic plan view of a railroad transportation system with which the present invention may be used.

Referring now in more detail to the drawing, there is illustrated in FIG. 1 a railroad transportation system with which apparatuses and methods embodying principles of the invention may be used. The system is seen to include a pair of circuitous parallel rails 10 between which extends a series of rotatable tubes or drive shafts 11 for propelling a car or dolly 12 over the rails. The transportation system includes a loading dock 15 adapted to receive cargo from a conveyor belt 77 for subsequent delivery by the car to an unshown cargo handling and distribution station aside the railroad tracks.

Figure 2:
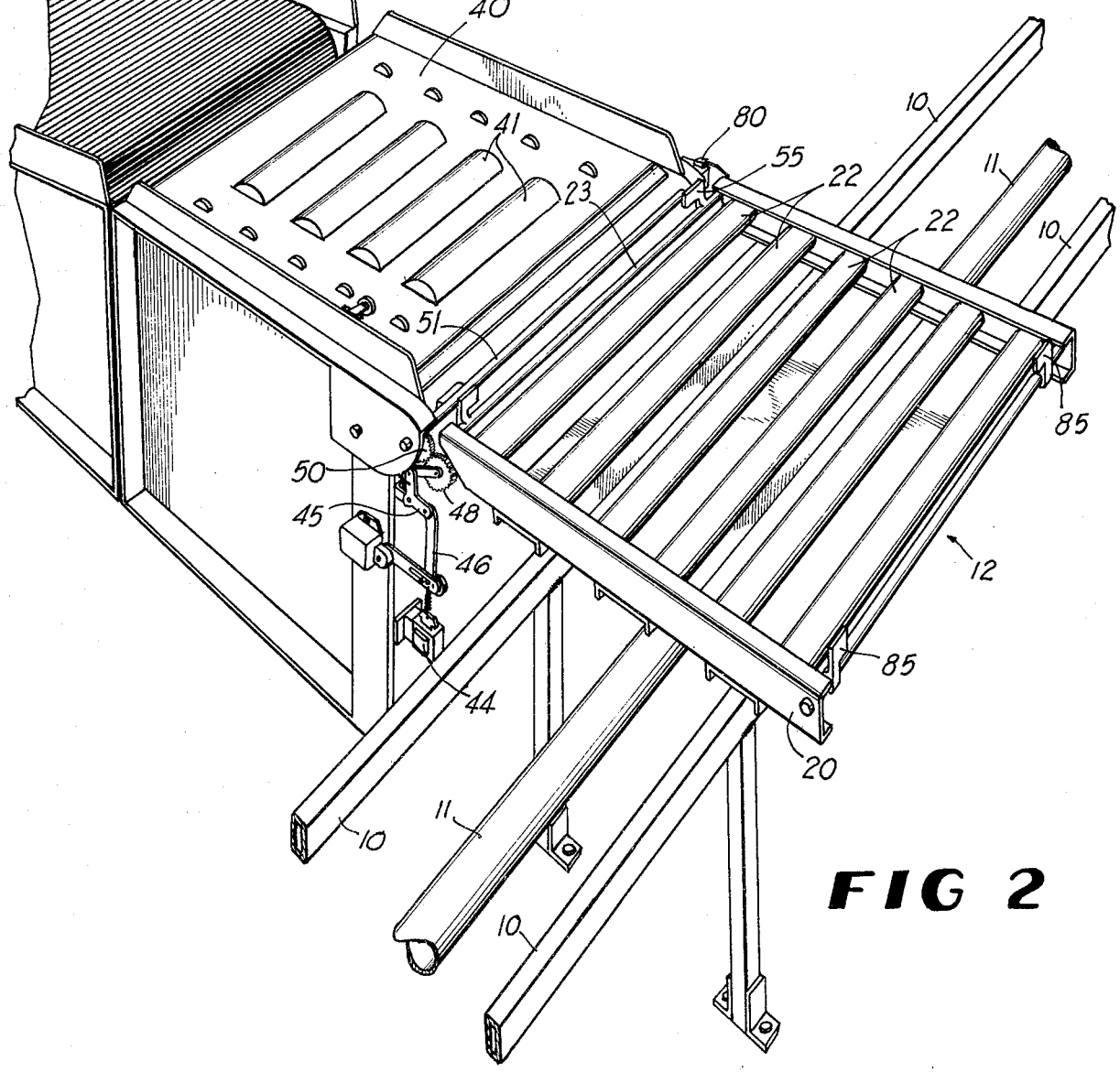
FIG. 2 is a perspective view of apparatus embodying the invention in a preferred form which apparatus may be used in practicing methods of the invention.
Figure 3:
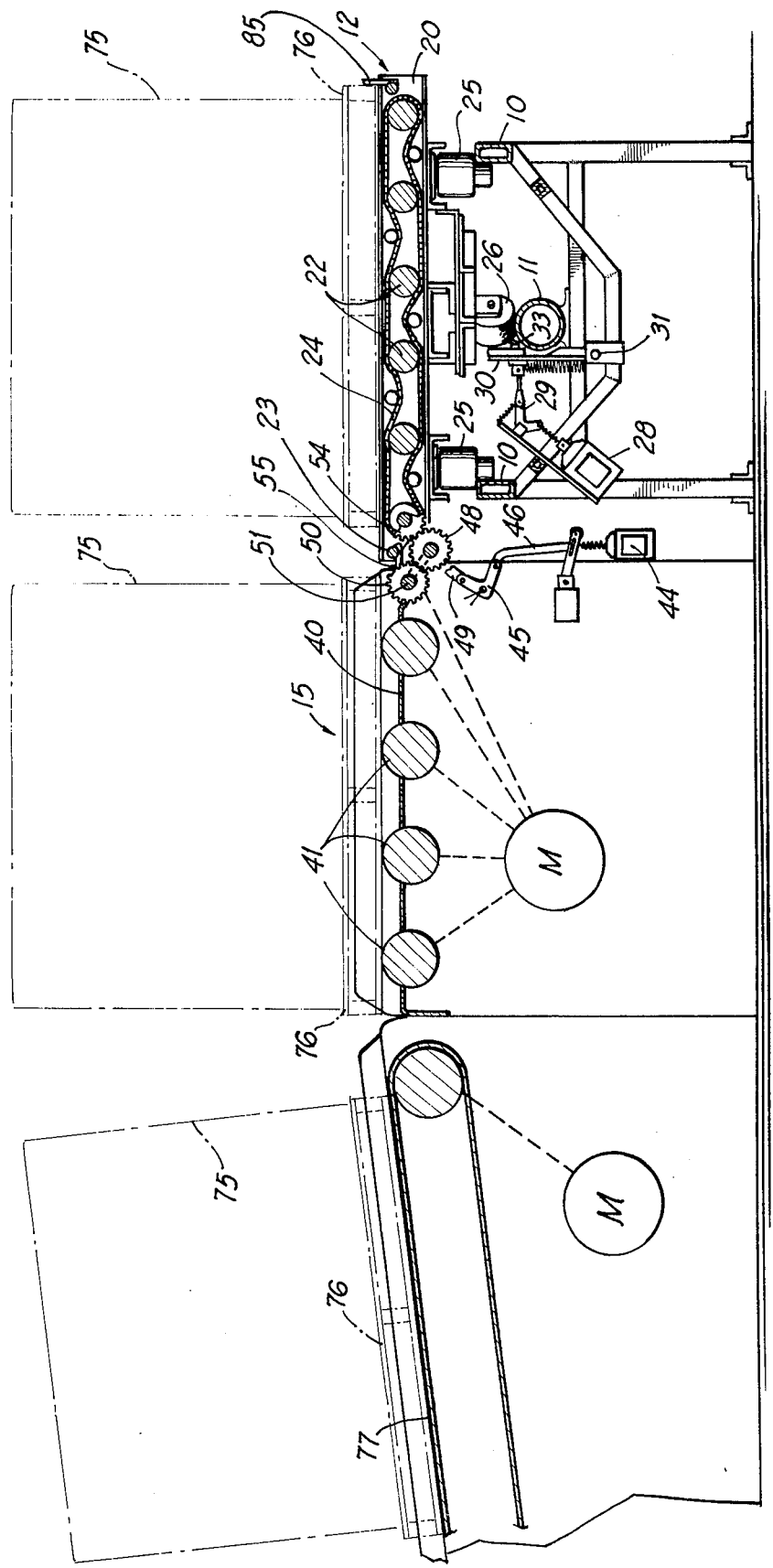
FIG. 3 is a side view in elevation of the apparatus depicted in FIG. 2.

With reference to FIGS. 2 and 3 car 12 is seen to include a frame 20 which supports a set of parallel car rollers 22. The car rollers are linked together by means of a chain 24 disposed in mesh with sprockets rigidly mounted to the ends of the rollers. The car is supported upon rails 10 by means of four support wheels 25 and is adapted to be driven over the rails by means of a drive wheel 26 disposable upon tube 11 at an oblique angle with respect thereto.

Means for braking the car to a complete halt adjacent dock 15 are provided which include a solenoid 28 coupled by means of a bell crank 29 to a camming block 30. Through actuation of the solenoid the camming block may be pivoted above pivot pin 31 between a vertical position as shown in FIG. 3 and an inclined position. For braking, the camming block is positioned vertically whereby a cam follower 33 mounted to the undercarriage of the car may engage the camming block causing drive wheel 26 to pivot upwardly out of engagement with tube 11. This pivoting action causes an unshown brake wheel oriented substantially normal to the tube to be placed in engagement with the tube thereby effecting a strong braking action on the car. A surface detent in the camming block receives the cam follower at the termination of braking bringing the car to a complete halt at the loading station. The car will remain in this position until solenoid 28 is again actuated swinging the camming block counterclockwise, as viewed in FIG. 3, out of engagement with the cam follower and causing the brake wheel to disengage tube 11 and the drive wheel to be brought once again into driving engagement with the rotating tube thereby propelling the car out of the loading station. Other braking means may, of course, be substituted for the specific type just described.

Figure 4:
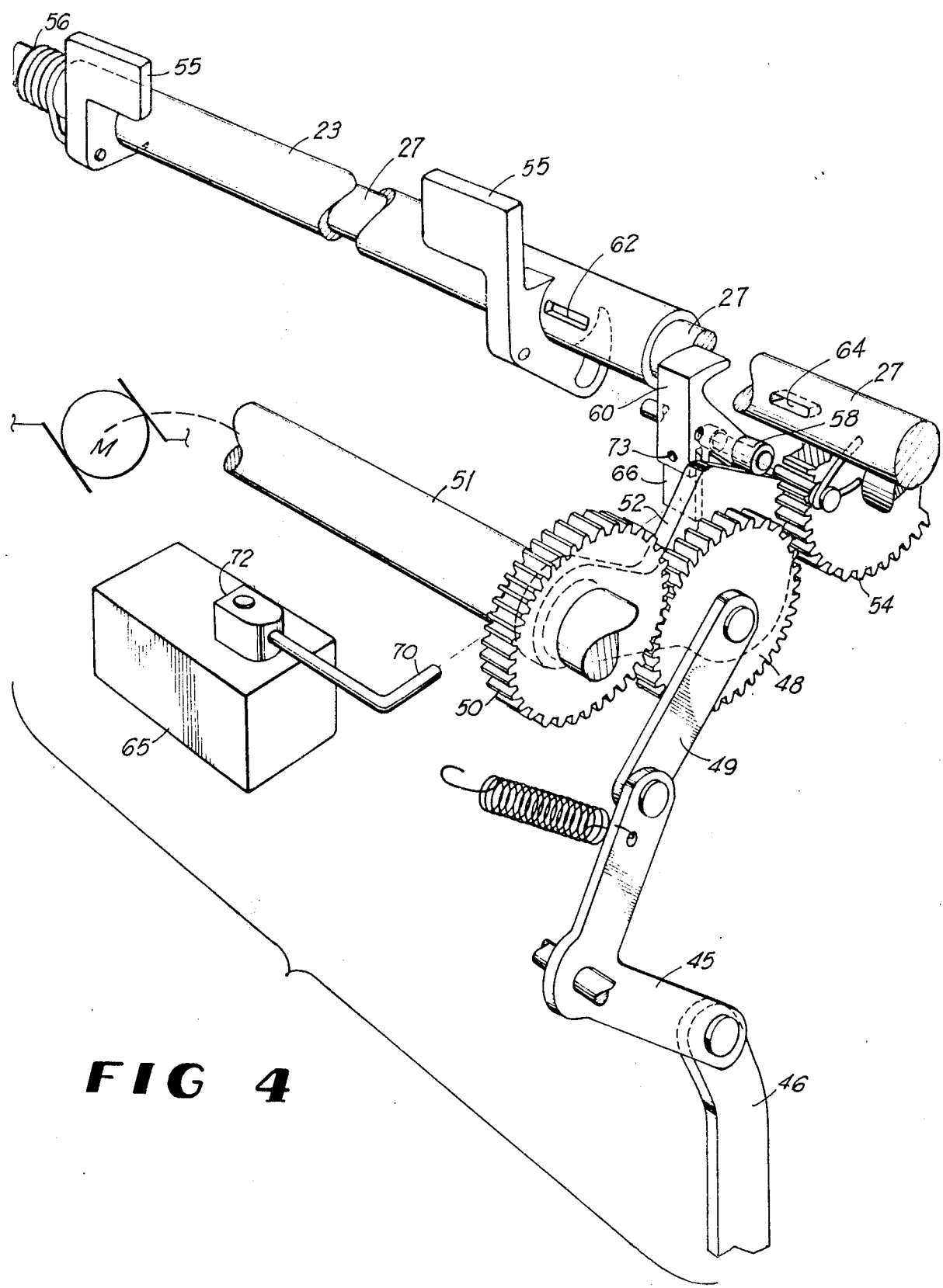
FIG. 4 is an exploded view in perspective of a portion of the apparatus shown in FIGS. 2 and 3.

With reference to FIGS. 2–4 means are illustrated for coupling car rollers 22 with platform rollers 41 rotatably mounted atop a cargo transfer table or platform 40 stationarily disposed at loading dock 15. This coupling enables drive imparted to the platform rollers by motor M to be transmitted to the car rollers. The coupling mechanism is seen to include a solenoid 44 connected to a bell crank 45 by means of a link 46. A coupling or planet gear 48 is coupled to bell crank 45 by means of link 49 and is mesh with a drive or sun gear 50 rigidly secured to a platform pin 51. The planet gear is maintained in continuous mesh with the sun gear by means of a trip dog 52 loosely mounted to the platform pin.

To a rotatable car roller is rigidly secured a transmission or spur gear 54. The spur gear is axially positioned along the roller to be in radial alignment with sun gear 50 when car 12 is stationarily located at the loading station adjacent transfer platform 40. When in this position the spur gear may be coupled with the sun gear by rotation of planet gear 48 partially about the sun gear and into mesh with the spur gear.

Figure 9:
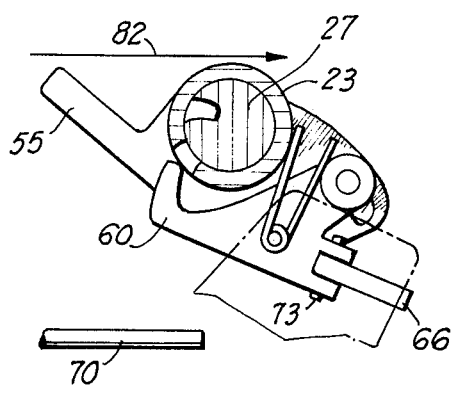

Telescoped about the fixed car pin 27 is a tubular sheath 23 to which a pair of cargo stops 55 is rigidly secured. These cargo stops are adapted to prevent cargo from being conveyed onto or off of the car except at such times as when the car is properly positioned at the loading station to receive or dispense cargo. These stops are normally disposed in the vertical position shown in FIGS. 2, 4–8, and 10 by means of a spring 56 connecting the fixed pin to the sheath and held there by a spring loaded catch or key 60. However, the stops are adapted to be rotated to the generally horizontal position shown in FIGS. 3 and 9 whereby cargo may be passed thereover and onto car 12 when the car is properly positioned at the loading station. This action is initiated by the previously described coupling mechanism for coupling sun gear 50 with spur gear 54. Specifically, revolution of planet gear 48 about sun gear 50 causes trip dog 52 to engage and cam a cam follower 58 secured to the spring loaded key 60, a catch portion of which is seated in a slot 62 formed in sheath 23 and a slot 64 in car pin 27 aligned with slot 62. As the cam follower and key are rotated, the catch portion of the key exits slot 64 but not slot 62 thereby causing sheath 23 to which stops 55 are secured to rotate to a substantially horizontal position.

In operation, cargo 75 mounted atop a pallet 76 may be conveyed by conveyor belt 77 onto transfer platform 40 atop platform rollers 41. As these rollers are not connected to drive means the cargo comes to a halt on the platform once it has lost its momentum from traveling atop the conveyor belt. With block 30 positioned by solenoid 28 in a vertical position a car 12 being driven by rotatable tube 11 over rails 10 is brought to a halt at loading dock 15 in alignment with the end of the transfer platform by means of the previously described brake mechanism. As this is achieved a leading edge of the car engages a limit switch 80 mounted to a far corner of the transfer platform. With an arm of the limit switch held in a car biased position an electric signal is generated indicating that the car is properly positioned at the loading station for acceptance or dispersion of cargo. A signal may then be generated by ancillary means for energizing solenoid 44. Energization of this solenoid causes link 46 to be pulled downwardly and to rotate bell crank 45 clockwise. This action causes planet gear 48 to revolve counterclockwise in mesh with sun gear 50. Revolution of the planet gear causes trip dog 52 to engage cam follower 58 and rotate key 60. Rotation of the key causes tang 66 to move switch actuator 70 enabling limit switch 65 to indicate a coupling together of sun gear 50 and spur gear 54 on car 12 and energize motor M.

Figure 5:
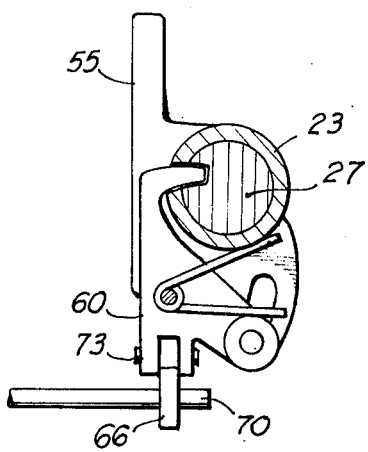
FIG. 5 is a side elevational view, partly in cross section, of cargo stop means included in the apparatus depicted in FIGS. 2–4.
Figure 6:
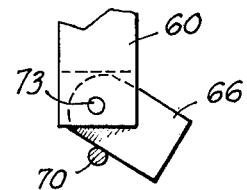
FIG. 6 is a rear view in elevation of a portion of the stop means depicted in FIG. 5 with the relative position of parts the same as that of FIG. 5.
Figure 7:
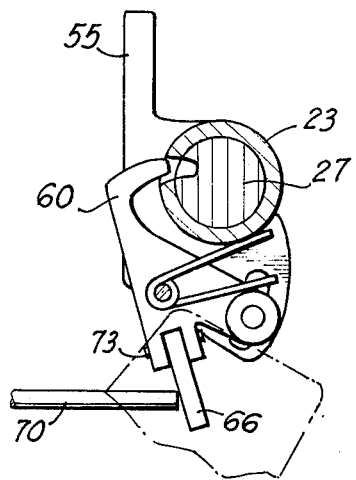
FIGS. 7–10 illustrate an operative sequence of events of the stop means depicted in FIG. 5 with the relative position of parts in FIGS. 7 and 8 being the same.
Figure 8:
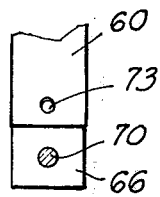

With reference to FIGS. 5–10 the movement of cargo stops 55 may be understood in more detail. In FIG. 5 key 60 is seen disposed in both of the aligned slots 62 and 64 in sheath 23 and pin 27, respectively. As car 12 approaches the loading station tang 66 mounted thereto engages the side of switch actuator 70 and pivots about tang support pin 73. With the switch actuator disposed beneath key 60 tang 66 is held in a pivoted position by the actuator itself as shown in FIG. 6. When the coupling means are energized and planet gear and trip dog 52 revolved about the sun gear key 60 is rotated causing the end of the key to exit slot 64 in pin 27. Key 60, however, is not rotated sufficiently far to bring the key out of slot 62 in sheath 23 as shown in FIG. 7. Accordingly, continued rotation of the key serves to urge sheath 23 counterclockwise against the bias provided by spring 56. This rotation of sheath 23 brings the pair of cargo stops 55 secured to the sheath to the position shown in FIG. 9. So located, a pallet with cargo thereon may be passed over the stop as indicated by arrow 82 in FIG. 9 and by the left to right series of cargo positional outlines depicted in FIG. 3.

Figure 10:
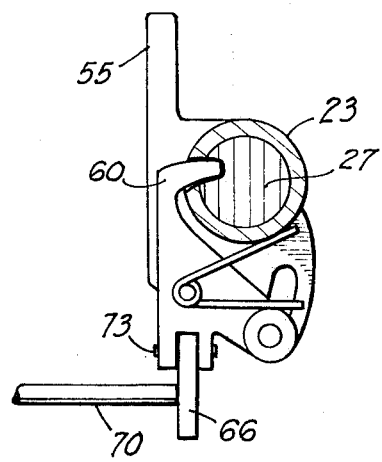

With car 12 still in the proper loading position, and with gears 50, 48 and 54 in mesh and limit switch 65 thereby actuated, motor M is energized driving pin 51. The driving of pin 41 causes gears 50, 48 and 54 to revolve as a gear train thereby driving car rollers 22 and platform rollers 41 coupled thereto. The driving of platform rollers causes cargo supported thereon to be urged off the transfer table, over the cargo stops, and onto the car. As the cargo is moved onto the car the car rollers 22 drive the cargo well onto the car and positively up against fixed stops 85. With the cargo fully loaded onto the car motor M and solenoid 44 are de-energized. This de-energization causes the drive imparted to drive wheel 50 to terminate and brings planet gear 48 clockwise out of engagement with spur gear 54. Simultaneous with this action trip dog 52 is brought out of engagement with cam follower 58. This disengagement enables the spring loaded sheath 23 and spring loaded key 60 to rotate back to the initial position with stop 55 reoriented vertically as shown in FIGS. 5 and 10. In rotating back to this vertical position tang 66 is brought into engagement with switch actuator 70 causing the actuator and switch turret 72 to rotate clockwise. In this position the limit switch prohibits re-energization of motor M. In this position it is also possible, through the use of circuitry, to energize solenoid 28 to release the braking mechanism holding the car at the transfer station. Drive wheel 26 on the car will thus be brought back into engagement with rotating tube 11 thereby driving the car out of the loading station with pallet 76 and cargo 75 disposed wholly on the car. With the car out of the station another cycle of loading operation may commence. For unloading the drive imparted by motor M to pin 51 is reversed.

It should, of course, be understood that the just-described embodiments merely illustrate principles of the invention in selected forms. Many modifications may, of course, be made to the just-described embodiments without departure from the spirit and scope of the invention as set forth in the following claims.

What is claimed is:

1. A cargo loading system comprising a car; cargo conveying means mounted on said car; transmission means mounted on said car for transmitting driving force to said cargo conveying means; drive means positioned at a cargo loading station; and gear coupling means for coupling said drive means with said transmission means when said car is located at said loading station;

said drive means including a drive gear; said transmission means including a transmission gear; said coupling means including a coupling gear adapted to mesh with said drive gear and said transmission gear, said coupling means further including means for revolving said coupling gear at least partially about the axis of said drive gear in mesh with said drive gear whereby the drive gear may function as a sun gear and the coupling gear as a planet gear;

said cargo loading system further comprising cargo stop means mounted to said car for movement between a position inhibiting conveyance of cargo by said cargo conveying means onto and off said car and a position permitting conveyance of cargo by said cargo conveying means onto and off said car, and cargo stop actuating means including a camming surface mounted to said revolving means.

2. A cargo loading system comprising a car; cargo conveying means mounted on said car; transmission means mounted on said car for transmitting driving force to said cargo conveying means; drive means positioned at a cargo loading station; and gear coupling means for coupling said drive means with said transmission means when said car is located at said loading station;

said cargo loading system further comprising cargo stop means mounted to said car for movement between a position inhibiting conveyance of cargo by said cargo conveying means onto said car and a position permitting conveyance of cargo by said conveying means onto said car; and cargo stop actuating means for moving said cargo stop means between said inhibiting and permitting positions and with said cargo stop actuating means including a camming surface connected to said coupling means.

3. A cargo loading system comprising a cargo transfer platform for receiving cargo; first conveyor means supported on said cargo transfer platform for moving cargo thereover; drive means for driving said first conveyor means; a car; a second conveyor means supported on said car for moving cargo received from said cargo transfer platform; coupling means for coupling said first and second conveyor means together when said car is located adjacent said cargo transfer platform for loading; said coupling means including a sun gear, a planet gear in mesh with said sun gear, and means for revolving said planet gear partially about said sun gear; and cargo stop means mounted to said car for movement between a position inhibiting conveyance of cargo by said first and second conveyor means onto said car and a position permitting conveyance of cargo by said first and second conveyor means onto said car;

said cargo stop means including a roller rotatably supported on said car, at least one stop bar rigidly mounted to said roller, a trip dog mounted adjacent said planet gear for revolution partially about said sun gear, and a cam follower coupled with said stop bar for engagement with said trip dog whereby revolution of the planet gear and trip dog may urge the trip dog against the cam follower thereby rotating the stop bar between said inhibiting and permitting positions.

4. A cargo handling system comprising, in combination:

a track system and at least one car movable along said track system;

a cargo loading/unloading station disposed adjacent said track system and including a cargo transfer platform having an end portion disposed in closely spaced relation to said track system at the same general elevation as said car but providing sufficient clearance to allow free passage of the car therepast, first cargo conveyor means mounted on said platform and drive means therefor including a sun gear at said end portion of the platform and rotatably mounted about an axis parallel to that section of said track system immediately adjacent said platform;

second cargo conveyor means mounted on said car and drive means therefor including a spur gear mounted on said car at that side thereof adjacent said platform for rotation about an axis parallel to said section of the track system, said spur gear being positioned to be disposed in spaced, aligned relation with said sun gear when said first and second cargo conveyor means are in alignment; and drive coupling means for drivingly interconnecting the drive means of the first cargo conveyor means with the drive means of the second cargo conveyor means when such cargo conveyor means are aligned as aforesaid, said drive coupling means including a planet gear, a coupling arm rotatably mounted at one end about the axis of said sun gear and rotatably carrying said planet gear in mesh with said sun gear, and means for selectively swinging said coupling arm about said axis of the sun gear to displace said planet gear outwardly from said end portion of the platform into meshed engagement with said spur gear;

cargo stop means located along said side of the car adjacent said platform for movement into and out of cargo blocking position; and means interconnecting said coupling arm with said cargo stop means, for moving said cargo stop means to said unblocking position as said coupling arm swings said planet gear into mesh with said spur gear and vice versa.

5. A cargo handling system as defined in claim 4 wherein said drive means of the first cargo conveyor means includes a drive motor; a limit switch on said platform controlling enablement of said drive motor and including an arm engagable by said cargo stop means as the car moves into position whereby to enable operation of said drive motor.

6. A cargo handling system as defined in claim 5 wherein said cargo stop means includes a pivoted tang engaging said arm of the limit switch as the car moves into position, said tang being swung clear of said arm as said planet gear is meshed with said spur gear and pivoting, when clear of the arm, into position for reengaging such arm when said planet gear is returned from mesh with said spur gear, whereby decoupling of the two drive means disables actuation of said drive motor.

7. A cargo loading system comprising a conveyor; a track passing through a loading station located adjacent said conveyor; at least one car movably supported on said track; a cargo transfer platform mounted between said conveyor and said loading station; first cargo conveying means for conveying cargo on said transfer platform; second cargo conveying means for conveying cargo on said car; means for sensing the presence of said car at said loading station; means for coupling together and driving said first and second cargo conveying means when the presence of said car is sensed by said sensing means whereby cargo delivered by the conveyor onto the transfer platform may then be conveyed off of the transfer platform and onto the car; cargo stop means mounted on said car for movement between operative and inoperative positions for respectively inhibiting and permitting the loading of cargo onto said car from said cargo transfer platform; and stop actuation means coupled with said means for coupling together and driving said first and second cargo conveying means for positioning said stop means in said operative position when said first and second cargo conveying means are uncoupled and for positioning said stop means in said inoperative position when said first and second cargo conveying means are coupled together.

* * * * *